(12) United States Patent
Ranmuthu et al.

(10) Patent No.: US 11,552,555 B2
(45) Date of Patent: Jan. 10, 2023

(54) CIRCUIT ELECTROMAGNETIC INTERFERENCE CONTROL

(71) Applicant: TEXAS INSTRUMENTS INCORPORATED, Dallas, TX (US)

(72) Inventors: Indumini Ranmuthu, Plano, TX (US); Brian Thomas Lynch, Brookline, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/139,470

(22) Filed: Dec. 31, 2020

(65) Prior Publication Data

US 2022/0209655 A1 Jun. 30, 2022

(51) Int. Cl.
*H02M 1/44* (2007.01)
*H02M 3/158* (2006.01)

(52) U.S. Cl.
CPC .......... *H02M 1/44* (2013.01); *H02M 3/1582* (2013.01)

(58) Field of Classification Search
CPC ............. H02M 3/1582; H02M 1/0032; H02M 1/0035; H02M 2001/0032; H02M 2001/0035
See application file for complete search history.

(56) References Cited

U.S. PATENT DOCUMENTS

| | | | | |
|---|---|---|---|---|
| 6,188,206 B1* | 2/2001 | Nguyen | ............... | H02M 3/1588 323/283 |
| 2005/0052168 A1* | 3/2005 | Tazawa | ............... | H02M 3/1584 323/282 |
| 2012/0032658 A1* | 2/2012 | Casey | ................. | H02M 3/1582 323/271 |
| 2018/0337601 A1* | 11/2018 | Vadnerkar | ............... | H02M 1/44 |
| 2019/0305666 A1* | 10/2019 | Yang | ................... | H02M 3/1582 |
| 2021/0184577 A1* | 6/2021 | Yang | ..................... | H02M 3/157 |

FOREIGN PATENT DOCUMENTS

CN 102055335 B * 8/2015

\* cited by examiner

*Primary Examiner* — Peter M Novak
(74) *Attorney, Agent, or Firm* — Frank D. Cimino

(57) ABSTRACT

In some examples, a circuit includes a state machine. The state machine is configured to operate in a buck state in which the state machine is configured to control a power converter to operate in a buck mode of operation at a first frequency. The state machine is configured to determine that a switch time of the power converter has decreased to within a threshold amount of a minimum switch time for the power converter. The state machine is configured to, responsive to the switch time of the power converter having decreased to within the threshold amount of the minimum switch time for the power converter, transition from the buck state to a reduced frequency buck state in which the state machine is configured to control the power converter to operate in the buck mode of operation at a second frequency that is less than the first frequency.

21 Claims, 3 Drawing Sheets

CIRCUIT ELECTROMAGNETIC INTERFERENCE CONTROL

BACKGROUND

A switched mode power supply (SMPS) transfers power from an input power source to a load by switching one or more power transistors or other switching elements coupled through a switch node/terminal to an energy storage element (such as an inductor, an inductance of a transformer, and/or a capacitor), which is capable of coupling to the load. The power transistors can be included in a power converter that includes, or is capable of coupling to, the energy storage element. A SMPS can include a SMPS controller to provide one or more gate drive signals to the power transistor(s). Switching of the power transistor(s) according to the one or more gate drive signals can create electromagnetic interference, such as at a frequency at which the power transistors are switched according to the one or more gate drive signals.

The input voltage to the converter may be greater than, less than or equal to the output voltage. If the input voltage is greater than the output voltage, the converter may be referred to as a "step-down" converter/regulator or a "buck converter." If the input voltage is less than the output voltage, the converter/regulator may be referred to as a "step-up" converter/regulator or a "boost converter." If the converter/regulator can perform both step-up and step-down functions, then it may be referred to as a "buck-boost converter."

SUMMARY

In some examples, a circuit includes a state machine. The state machine is configured to operate in a buck state in which the state machine is configured to control a power converter to operate in a buck mode of operation at a first frequency. The state machine is configured to determine that a switch time of the power converter has decreased in value to within a threshold amount of a minimum switch time for the power converter. The state machine is configured to, responsive to the switch time of the power converter having decreased in value to within the threshold amount of the minimum switch time for the power converter, transition from the buck state to a reduced frequency buck state in which the state machine is configured to control the power converter to operate in the buck mode of operation at a second frequency that is less than the first frequency.

In some examples, a circuit includes a state machine. The state machine is configured to operate in a buck state in which the state machine is configured to control a power converter to operate in a buck mode of operation at a first frequency. The state machine is configured to determine that an output voltage of the power converter is greater than a threshold amount of an input voltage of the power converter. The state machine is configured to, responsive to the output voltage being greater in value than the threshold amount of the input voltage, transition from the buck state to a reduced frequency buck state in which the state machine is configured to control the power converter to operate in the buck mode of operation at a second frequency that is less than the first frequency.

In some examples, a system includes a load and a switched mode power supply (SMPS). The SMPS is adapted to be coupled to the load and includes a power converter configured to switch power to the load based on control exerted by the SMPS. The SMPS is configured to implement a state machine configured to operate in a buck state in which the state machine is configured to control a power converter to operate in a buck mode of operation at a first frequency. The state machine is configured to determine that a switch time of the power converter has decreased in value to within a threshold amount of a minimum switch time for the power converter. The state machine is configured to, responsive to the switch time of the power converter having decreased in value to within the threshold amount of the minimum switch time for the power converter, transition from the buck state to a reduced frequency buck state in which the state machine is configured to control the power converter to operate in the buck mode of operation at a second frequency that is less than the first frequency.

DETAILED DESCRIPTION

Figure 1:
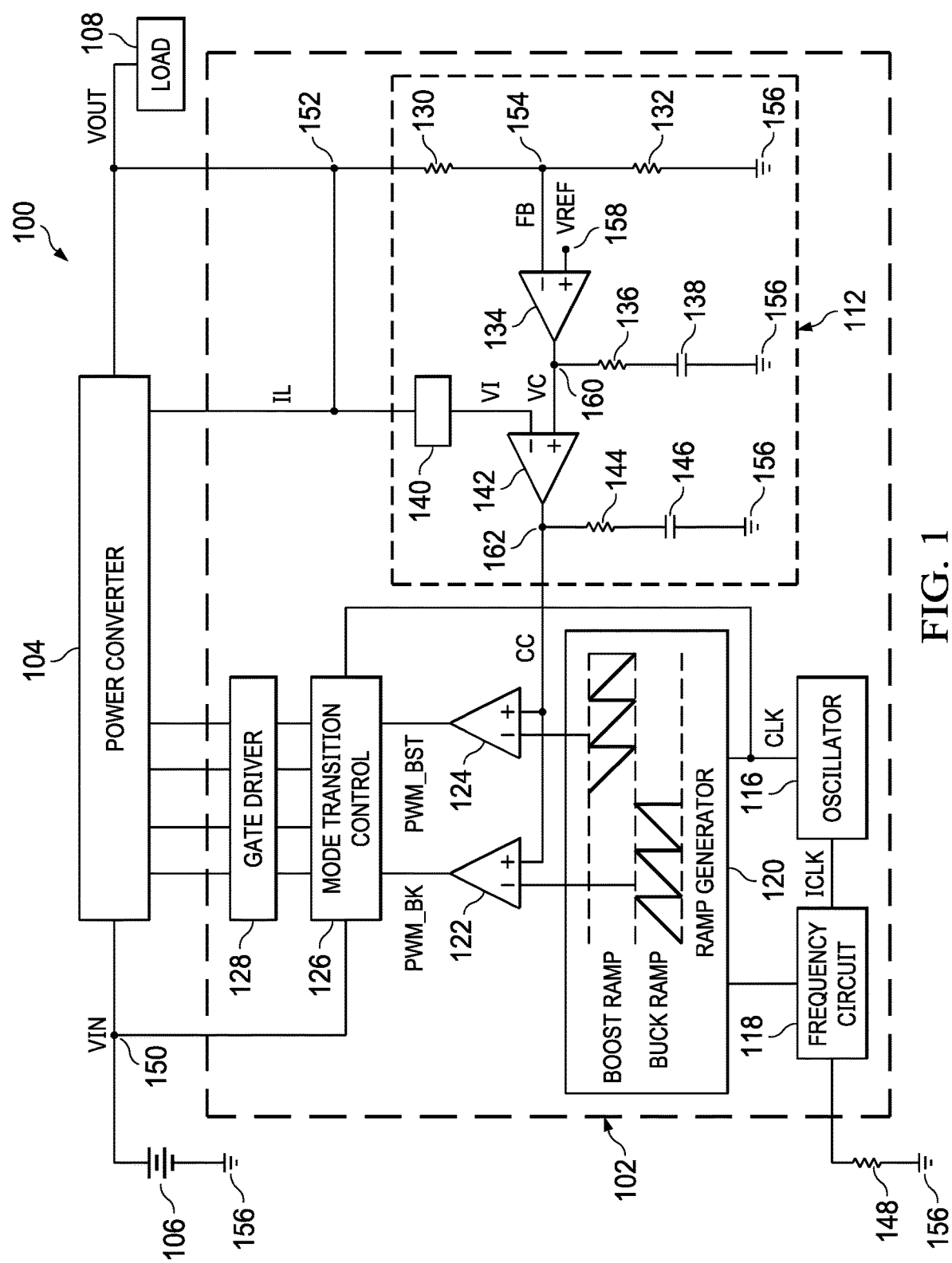
FIG. 1 is a block diagram of an example switched mode power supply (SMPS).

In some device architectures, a switched mode power supply (SMPS) includes, or is capable of coupling to, an output/bulk capacitor in parallel with the load. A SMPS controller switches power transistor(s) to form circuit arrangements with energy storage element(s) to supply a load current to the load and/or to the output/bulk capacitor to maintain a regulated output voltage. Alternatively, though not shown herein, at least some of the power transistors are implemented as passive switches, such as diodes. A power transistor can be coupled through the switch node/terminal to an energy storage inductor during charging and/or discharging switching states of a power converter. In at least some examples, the energy storage inductor is switched by the SMPS controller between charge and discharge switching states to supply inductor current (e.g., current through the energy storage inductor) to the load and to the output/bulk capacitor to maintain the regulated output voltage. As described above, in at least some examples, one or more of the power transistors are replaced by passive switches that react based on characteristics of a received input signal and are not switched by the SMPS controller. In some examples, a SMPS can be configured for operation as a constant current source with an energy storage element but with no output/bulk capacitor. Power converters periodically repeat sequences of switching states (such as "on" and "off" states). A single on/off cycle may be called a switching cycle.

The power transistors can be implemented as field effect transistors (FETs), such as metal-oxide field effect transistors (MOSFETs) or any other suitable solid-state transistor devices (e.g., such as bipolar junction transistors (BJTs)). Power converters can be of various architectures, each having certain functionality, such as buck, boost, and buck-boost, among others. Depending on the application that a buck-boost converter is used in, the input voltage (VIN) and/or the output voltage (VOUT) of the power converter may vary. To address this, the SMPS controller will control the buck-boost converter to operate in different modes of operation. For example, based on VIN being greater than VOUT, the SMPS controller will cause the power converter to operate in a buck mode of operation. Based on VIN being less than VOUT, the SMPS controller will cause the power converter to operate in a boost mode of operation. Based on VIN being approximately equal to VOUT, the SMPS controller will cause the power converter to operate in a buck-boost mode of operation, or in alternate cycles of buck-mode and boost-mode operation. The above examples are non-exclusive and apply generally to a power converter of buck-boost topology or architecture. However, at least some of the above examples also apply to power converters of other topologies or architectures, such as buck or boost, operating under certain modes of control.

To control a mode of operation of the power converter, the SMPS controller provides gate control signals to one or more power transistors of the power converter. The gate control signals received by a power transistor control whether the power transistor is in a conductive state (e.g., turned on) or in a non-conductive state (e.g., turned off). Each state of a power converter involves a specific combination of transistors that are in conducting states and transistors that are in non-conducting states. To change a mode of operation of the power converter, the SMPS controller modifies the sequence of switching states that it commands the transistors to assume. In at least some examples, the SMPS controller implements a state machine or other logic such that values of the gate control signals are determined based on a mode of operation of or for the power converter. Also, while remaining in a mode of operation of the power converter, the SMPS controller may modify a value of one or more of the gate control signals, such as to alternatively turn on and turn off one or more power transistors.

Turning on and off the power transistors can create electromagnetic interference (EMI) at a frequency determined based on the frequency at which the power transistors are turned on and off. Some use cases for a SMPS are sensitive to EMI in certain frequency ranges of interest. For example, when a SMPS is implemented in an automobile, there may be sensitivities around a frequency range of about 550 hertz to about 1720 kilohertz (kHz), corresponding to an Amplitude Modulation (AM) radio frequency band. In other examples, the implementation environments or use cases for the SMPS may be sensitive to other frequencies, such as in various communication implementations, implementations in which other components exist that are sensitive to EMI in a certain frequency range (e.g., such that their function may be detrimentally affected if EMI exists in that certain frequency range), a human-audible frequency range (e.g., about 20 hertz to about 15-20 kHz), etc. Generally, a SMPS is either designed, or controlled, to operate at frequencies outside of these frequency ranges of interest. As described above, responsive to VIN becoming approximately equal to VOUT in a buck-boost power converter, the power converter may operate in a buck-boost mode of operation. In the buck-boost mode of operation, the power converter may alternate back and forth between a buck cycle and a boost cycle, or a few buck cycles and a few boost cycles, until exiting the buck-boost mode of operation. While operating in this manner, an effective switching frequency of the power converter may be approximately half of the switching frequency at which the power converter is operating. As used herein, the effective switching frequency may be a frequency of inductor current ripple of the inductor of the power converter. Thus, despite the switching frequency of the power converter being configured to be outside of a frequency range of interest, the effective switching frequency may be within the frequency range of interest. In at least some examples, the effective switching frequency being within the frequency range of interest may cause potentially detrimental or disadvantageous EMI in the frequency range of interest, rendering the power converter, or a SMPS including the power converter, unsuitable, or a less than ideal choice, for implementation in an implementation in which the frequency range of interest is applicable.

In another example, a buck power converter, or a buck-boost power converter operating in a buck mode of operation, may exit a controlled, or regulated, state under certain conditions. For example, responsive to an on-time (Ton) of the buck converter decreasing below a minimum Ton time for the buck converter while VIN is increasing in value, or an off time (Toff) time decreasing below a minimum Toff time while VIN is decreasing in value, such as to approach VOUT in value, the buck converter may be unable to remain in regulation. After exiting the controlled, or regulated state, VOUT may no longer be regulated to a programmed value. Thus, while VOUT may still be provided, it may be provided at an inaccurate value. In at least some examples, the on-time and the off-time refer to time that power transistors, or switches, are controlled to be turned on, or turned off, respectively. Accordingly, in at least some examples, the on-time and the off-time may each be referred to as a switch time.

At least some aspects of this description relate to a control scheme for controlling a power converter, such as may be an element of, or be implemented in, a SMPS. In some examples, the power converter is a buck-boost power converter. In such examples, a controller of the SMPS is configured to control the power converter to operate in buck, boost, or buck-boost modes of operation. Based on that control, a high-side power transistor of the power converter is controlled by the controller to have a certain Ton or a certain Toff. Responsive to Ton being greater in value than a minimum Ton time (min Ton), the power converter may operate in the buck mode of operation, and responsive to Toff being greater in value than a minimum Toff time (min Toff), the power converter may operate in a boost mode of operation. As VIN nears VOUT in value, Ton decreases in the buck mode of operation, and Toff decreases in the boost mode of operation. Responsive to Ton no longer being greater in value than min Ton, or Toff no longer being greater in value than min Toff, the power converter may transition to operate in the buck-boost mode of operation. As described above, this can cause the power converter to have an effective switching frequency that may adversely affect other components or devices.

In at least some examples, responsive to Ton decreasing to be within a threshold amount of min Ton, or Toff decreasing to be within a threshold amount of min Toff, the controller may control the power converter to reduce the switching frequency of the power converter from a programmed switching frequency to a reduced switching frequency. The threshold amount may be programmable such that it may be adapted to fit various implementation environments or use cases. In at least one example, the threshold is about ten percent. If the switching frequency is greater in value than those frequencies in the frequency range of interest, the controller may control the power converter to reduce the switching frequency to have a value less than those frequencies in the frequency range of interest. In this way, the controller controls the power converter to reduce the switching frequency prior to the power converter entering the buck-boost mode of operation. By controlling the power converter to have the switching frequency with the value less than those frequencies in the frequency range of interest, the effective switching frequency of the power converter may be controlled to not be within the frequency range of interest, such as during the buck-boost mode of operation.

If the power converter is controlled to operate at the lower frequency, Ton and Toff may increase, thus prolonging an amount of time that the power converter operates in the buck mode of operation or the boost mode of operation. Said another way, while the power converter is controlled to operate at the lower frequency, Ton and Toff may increase, narrowing a buck-boost window of the power converter. Thus, after the controller controls the power converter to reduce the switching frequency, the power converter may enter the buck-boost mode of operation responsive to Ton becoming less than min Ton or Toff becoming less than min Toff. If Ton subsequently becomes greater than min Ton, or Toff becomes greater than min Toff, the power converter may exit the buck-boost mode of operation to the buck mode of operation or the boost mode of operation, respectively. Similarly, responsive to Ton becoming greater in value than the threshold amount of min Ton, or Toff becoming greater in value than the threshold amount of min Toff, the controller may control the power converter to return to operation at its programmed switching frequency prior to the reduction by the controller. In this way, the controller controls the power converter to reduce its switching frequency during a time period in which operation of the power converter could create EMI in the frequency band or range of interest, preventing or at least reducing an amount of EMI created in the frequency band or range of interest by operation of the power converter. In at least some implementations of the power converter (such as in an automobile), the programmed switching frequency is about 2.1 megahertz (MHz) and the reduced switching frequency is about 400 kHz.

In other examples, the power converter is a buck power converter (or a buck-boost power converter operating in a buck mode of operation) or a boost power converter (or a buck-boost power converter operating in a boost mode of operation). In such an example, as described above, Ton or Toff may reach values that cause the buck power converter to exit a regulated state. To prevent the power converter from existing the regulated state, in some examples, the controller controls the power converter with a digitally programmable Ton or Toff. The controller performs the control, in at least some examples, via, or with use of, a delay line pulse width modulator. Controlling the power converter with a digitally programmable Ton or Toff, in at least some examples, avoids the frequency range of interest and maintains the power converter in the regulated state.

FIG. 1 is a block diagram of an example SMPS 100. In at least one example, the SMPS 100 includes a controller 102 and a power converter 104. The SMPS 100, at least through the power converter 104, switches power provided based on a power source 106 from a node 150 to a load 108. In some examples, the power converter 104 is a buck-boost power converter that is capable of operating according to a buck mode of operation, a boost mode of operation, and/or a buck-boost mode of operation. In other examples the power converter 104 is one of a buck power converter or a boost power converter, though the buck-boost power converter implementation is assumed for description herein. In at least one example, the controller 102 includes, or is adapted to be coupled to, a feedback circuit 112, an oscillator 116, a frequency circuit 118, a ramp generator 120, a comparator 122, a comparator 124, a mode transition control circuit 126, and a gate driver 128. The SMPS 100 of this description is shown and described as implementing average current mode control over the power converter 104. However, other control methods are possible, such as peak current mode control, voltage mode control, or any other suitable form of control implemented in a fixed frequency method, variable frequency method, constant time method (e.g., constant Ton or constant Toff), etc.

At least one example of the SMPS 100 includes at least some aspects of the controller 102 and the power converter 104 on a same semiconductor die and/or in a same component package (or encapsulation), while in other examples the controller 102 and the power converter 104 may be fabricated separately and adapted to be coupled together. For example, at least some aspects of the controller 102 may be fabricated separately and coupled together. Accordingly, while shown as including the gate driver 128, in at least one example the controller 102 does not include the gate driver 128 and is adapted to be coupled to the gate driver 128. Similarly, other components shown as being included in the controller 102 may rather be adapted to be coupled, in whole or in part, to the controller 102 and not be included on a same semiconductor die and/or in a same component package as the controller 102. Similarly, components shown or described in this description as being included in the power converter 104 (such as an inductor) may rather be adapted to be coupled, in whole or in part, to the power converter 104 and not be included on a same semiconductor die and/or in a same component package as the power converter 104.

In at least one example, the feedback circuit 112 includes a resistor 130 coupled between a node 152 and a node 154 and a resistor 132 coupled between the node 154 and a ground node 156. The feedback circuit 112 includes an amplifier 134 having a first input (e.g., a non-inverting input) coupled to a node 158 and configured to receive a reference voltage (VREF) at the node 158. The amplifier 134 further has a second input (e.g., an inverting input) coupled to the node 154, and an output coupled to a node 160. A feedback signal (FB) is provided at the node 154 and is a scaled representation of VOUT, scaled according to a ratio of resistance of the resistor 132 to resistance of the resistor 130. A signal (VC) is provided at the node 160, provided by the amplifier 134 based on a difference between VREF and FB. A resistor 136 is coupled between the node 160 and a top plate of a capacitor 138 and a bottom plate of the capacitor 138 is coupled to the ground node 156. The feedback circuit 112 includes a current sense circuit 140 and an amplifier 142. The current sense circuit 140 is adapted to be coupled to the power converter 104 to provide an output signal (VI) that is a voltage representation of a current flowing through the power converter 104. The amplifier 142 has a first input (e.g., a positive or non-inverting input) coupled to the node 160, a second input (e.g., a negative or inverting input) coupled to an output of the current sense circuit 140, and an output coupled to a node 162. A current control signal (CC) is provided at the node 162, provided by the amplifier 142 based on a difference between VC and VI. A resistor 144 is coupled between the node 162 and a top plate of a capacitor 146 and a bottom plate of the capacitor 146 is coupled to the ground node 156.

The oscillator 116, in at least some examples, is any component or components suitable for generating a clock signal, shown in FIG. 1 as CLK. A frequency of CLK is determined, in at least some examples, based on a value of a signal received from the frequency circuit 118. For example, the frequency circuit 118 provides a current signal, shown in FIG. 1 as ICLK, based at least partially on a value of a resistor 148 coupled to the frequency circuit 118. The frequency circuit 118 provides ICLK to the oscillator 116 to enable the oscillator 116 to provide CLK at least partially according to ICLK. In at least some examples, the frequency circuit 118 further provides ICLK to the ramp generator 120.

The oscillator 116 provides CLK to, in some examples, the ramp generator 120 and the mode transition control circuit 126.

The ramp generator 120, in at least some examples, is any component or components suitable for generating buck and boost ramp signals for use in controlling the power converter 104. In at least some examples, the buck and boost ramp signals are provided by charging and resetting (e.g., discharging) one or more capacitors (not shown) at a specified rate of charge, specified by a current value of a signal charging the one or more capacitors. In at least some examples, based on the received CLK and ICLK signals, the ramp generator 120 provides the buck ramp signal and the boost ramp signal.

The comparator 122 includes a first input (e.g., a positive or non-inverting input) coupled to the node 162, a second input (e.g., a negative or inverting input) coupled to the ramp generator 120 and configured to receive the buck ramp signal from the ramp generator 120, and an output. The comparator 124 includes a first input (e.g., a positive or non-inverting input) coupled to the node 162, a second input (e.g., a negative or inverting input) coupled to the ramp generator 120 and configured to receive the boost ramp signal from the ramp generator 120, and an output. In at least some examples, a control signal, shown in FIG. 1 as PWM_BK, is provided at the output of the comparator 122 and a control signal, shown in FIG. 1 as PWM_BST, is provided at the output of the comparator 124. In some examples, PWM_BK has an asserted value responsive to CC being greater in value than the buck ramp and a deasserted value responsive to CC being lesser in value than the buck ramp. Similarly, in some examples, PWM_BST has an asserted value responsive to CC being greater in value than the boost ramp and a deasserted value responsive to CC being lesser in value than the boost ramp.

The mode transition control circuit 126 has inputs configured to receive at least CLK, PWM_BK, PWM_BST, VOUT, and VIN (sometimes collectively referred to with respect to the mode transition control circuit 126 as the received signals). In at least some examples, the mode transition control circuit 126 includes or implements a state machine to provide one or more control signals for controlling the power converter 104 according to the received signals. Operation of the mode transition control circuit 126 is described in greater detail below.

In at least one example, the SMPS 100 is configured to receive VIN from the power source 106 at the node 150 and provide VOUT at the node 152, such as for supplying the load 108. VOUT is based at least partially on VIN as provided at the node 150 and VREF as received by the SMPS 100 at the node 158. VREF may be received from any suitable device (not shown) such as a processor, microcontroller, reference circuit, bandgap circuit, or any other component, circuit, or device exerting control over the SMPS 100 to control a value of VOUT. In at least one example, VREF has a value representative of a specified (e.g., user-specified, target, preconfigured, programmed, etc.) value of FB. Based on a variance in value of VREF from FB, the controller 102 controls the power converter 104 to modify VOUT to cause FB to more closely match VREF. In at least some implementations, the controller 102 receives one or more signals from the power converter 104. For example, the controller 102 may receive VOUT from the power converter 104 and/or an inductor current (IL) of the power converter 104. In various examples, IL may be a value directly detected, measured, or sensed from an inductor (not shown) of the power converter 104 (or another component of the power converter 104 to which the inductor is also coupled). In at least one example, IL is provided to the feedback circuit 112 for generation of VI and VOUT is provided to the feedback circuit 112 and the mode transition control circuit 126. VI is provided based on IL, in at least some examples, by the current sense circuit 140. The current sense circuit 140 is, in some examples, a resistor.

In at least one example, the feedback circuit 112 is configured to receive VREF and VOUT (which leads to the providing of FB) and provides VC indicating a variation in FB from VREF. VC is referred to in some examples as an error signal. In at least some examples, FB is an output of a voltage divider formed of the resistor 130 and the resistor 132, where an input to the voltage divider is VOUT. VC is subsequently filtered by the resistor 136 and the capacitor 138 before being received by the amplifier 142. The amplifier 142, in at least one example, is configured to receive VC and VI and provide CC indicating a variation in VI from VC. CC is subsequently filtered by the resistor 144 and the capacitor 146 before being received by the comparator 122 and the comparator 124.

As described above, in at least one example, the frequency circuit 118 provides and provides a signal ICLK based on a resistance of the resistor 148. ICLK at least partially determines a frequency of a clock signal CLK provided and provided by the oscillator 116.

The mode transition control circuit 126 provides one or more control signals for controlling the gate driver 128 to control the power converter 104. While shown in FIG. 1 as generating and providing four control signals to the gate driver 128, such is merely one example of signals with respect to the mode transition control circuit 126. In at least one example, the mode transition control circuit 126 includes or otherwise implements a state machine (either digital or analog) to provide the control signals based on values of CLK, PWM_BK, PWM_BST, VOUT, and/or VIN. In other examples, the mode transition control circuit 126 may be implemented as a microcontroller or other form of processor which may execute executable code to perform the functions ascribed herein to the mode transition control circuit 126 or may implement a software-based state machine to perform the functions ascribed herein to the mode transition control circuit 126.

Based on the control signals received from the mode transition control circuit 126, the gate driver 128 provides one or more gate control signals for controlling power transistors of the power converter 104, as described above. While shown in FIG. 1 as generating and providing four gate control signals to the power converter 104, such is merely one example of signals with respect to the mode transition control circuit 126. For example, the gate driver 128 provides gate control signals that alternatingly, and selectively, turn the power transistors of the power converter 104 on and off to energize and de-energize energy storage element(s) such as an inductor and/or a capacitor (each not shown). This energizing and de-energizing provides the buck, boost, and/or buck-boost functionality described herein. The gate driver 128 is implemented according to any suitable architecture, the scope of which is not limited herein.

In at least some examples, the power converter 104 includes multiple power transistors, as described above. A time period during which the power transistors of the power converter 104 are controlled to energize the energy storage element(s) is referred to as Ton. A time period during which the power transistors of the power converter 104 are controlled to de-energize the energy storage element(s) is referred to as Toff. As described above, as VIN nears VOUT, the mode transition control circuit 126 controls the power converter 104 to transition to operation in the buck-boost mode of operation. However, operating in the buck-boost mode of operation may cause an effective switching frequency of the power converter 104 to be within a frequency range of interest, potentially disrupting operation of one or more devices or services. For example, while the mode transition control circuit 126 controls the power converter 104 to have a switching frequency of about 2.1 MHz and to operate in the buck-boost mode of operation, an effective switching frequency of the power converter 104 may be about 1.05 MHz. In such an example, the effective switching frequency of the power converter 104 is within the AM frequency band, which is the frequency range of interest for this example. Because the effective switching frequency of the power converter 104 is within the AM frequency band, EMI may be created at frequencies that interfere with AM frequency broadcasts. Such EMI that interferes with AM frequency broadcasts may be disadvantageous in certain implementations, such as automobiles or other devices that include AM reception or transmission capability, possibly rendering the SMPS 100 unsuitable, or at least not preferred or optimal, for use in these certain implementations.

In at least some examples, the mode transition control circuit 126 implements a state machine configured to control both the mode of operation of the power converter 104 and the switching frequency of the power converter 104. When the SMPS 100 is implemented in an application or environment in which the creation of EMI in a frequency range of interest may be disadvantageous, the mode transition control circuit 126, via the state machine, may dynamically modify the switching frequency of the power converter 104 based on a relationship between VIN and VOUT (and therefore Ton and Toff times) to prevent, or reduce, creation of EMI in the frequency range of interest.

Further, the mode transition control circuit 126 may implement a second state machine configured to modify Ton of the power converter 104. For example, based solely on the signals received by the mode transition control circuit 126, the mode transition control circuit 126 may provide control signals for controlling the power converter 104 to operate in a mode of operation that energizes an energy storage element or de-energizes the energy storage element (e.g., Ton or Toff, respectively). However, as described above, sometimes Ton according to these provided control signals is less than min Ton for the power converter 104 or Toff according to these provided control signals is less than min Toff, each of which results in an inability to maintain the power converter 104 in regulation. In such examples, the mode transition control circuit 126, via the second state machine, may programmatically, digitally, or otherwise modify the control signals to cause the power converter 104 to energize the energy storage element (e.g., such that the power converter 104 is in a Ton period of operation). Such provision of the control signals may cause the power converter 104 to operate according to constant Ton control, rather than a control method (e.g., such as fixed, or variable, frequency control, etc.) under which the power converter 104 would be controlled in the absence of the operations of the mode transition control circuit 126 implementing the second state machine.

Figure 2:
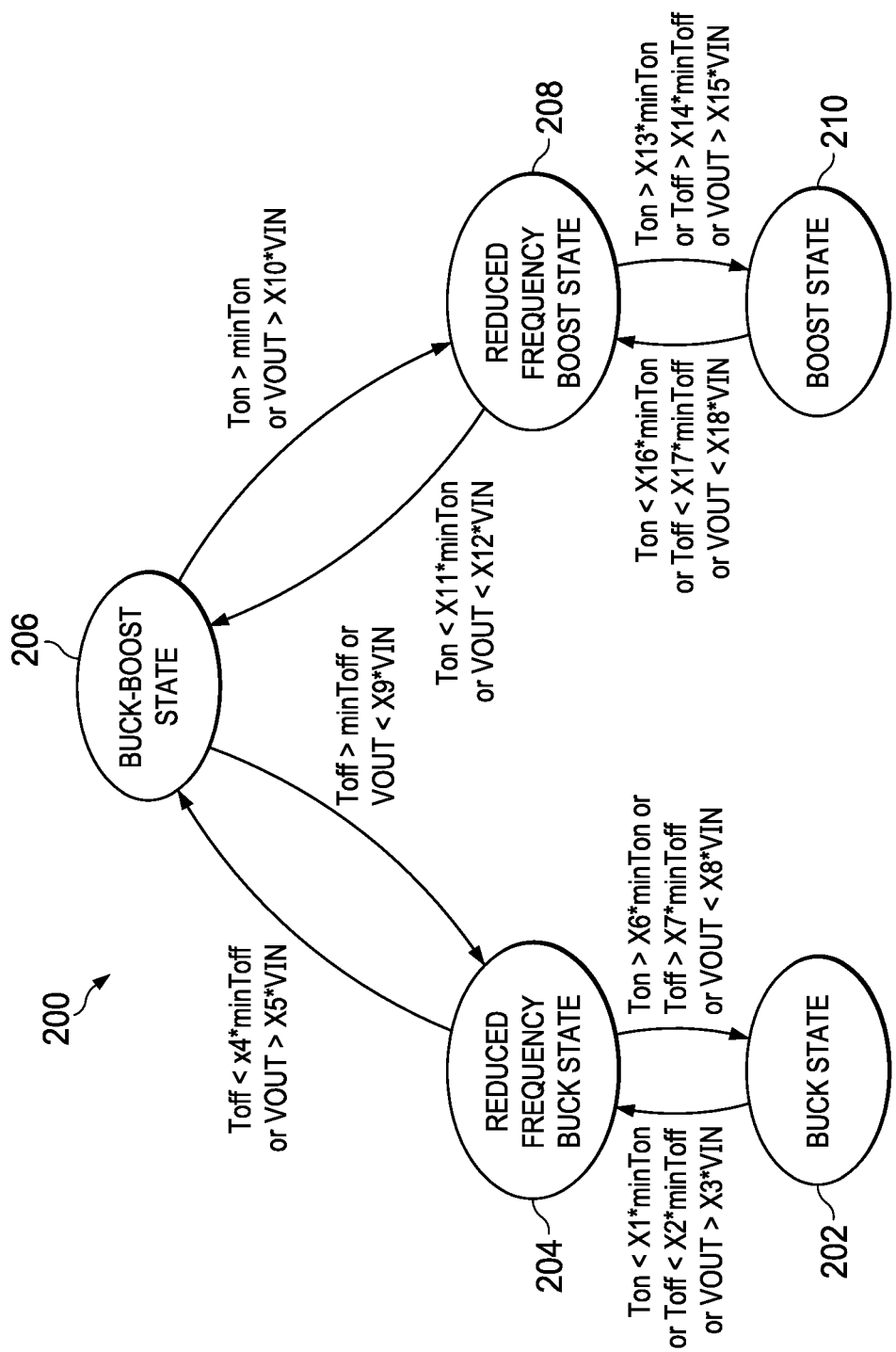
FIG. 2 is state diagram of an example state machine for implementation in a SMPS.

FIG. 2 is an example state diagram 200. In at least some examples, the state diagram 200 shows states and transition conditions for a state machine implemented by the mode transition control circuit 126. Accordingly, reference may be made to components and/or signals of one or more other figures of the description in describing the state diagram 200. Description of the state diagram 200 begins with the buck state 202, making an assumption that the power converter 104 is first controlled to operate in the buck mode of operation. However, if the power converter 104 is controlled to first operate in the boost mode of operation, a first state of the state diagram 200 that may be implemented may be the boost state 210.

At buck state 202, the mode transition control circuit 126 provides control signals for controlling the power converter 104 to operate in the buck mode of operation at a programmed frequency. While controlling the power converter 104 to operate in the buck mode of operation, the mode transition control circuit 126 monitors a received input signals to determine whether to transition to a reduced frequency buck state 204. For example, while operating in the buck state 202 and the mode transition control circuit 126 determines based on the received input signals that Ton is less than a threshold value of min Ton (e.g., such as a threshold value formed by multiplying min Ton by a constant X1, where the constant X1 is any suitable non-zero number), the mode transition control circuit 126 provides control signals to cause the power converter 104 to transition to a reduced frequency buck state 204. In at least some examples, X1 is 1.1. As another example, while operating in the buck state 202 and the mode transition control circuit 126 determines based on the received input signals that Toff is less than a threshold value of min Toff (e.g., such as a threshold value formed by multiplying min Toff by a constant X2, where the constant X2 is any suitable non-zero number), the mode transition control circuit 126 provides control signals to cause the power converter 104 to transition to the reduced frequency buck state 204. In at least some examples, X2 is 1.1. As yet another example, while operating in the buck state 202 and the mode transition control circuit 126 determines based on the received input signals that VOUT is greater than a threshold value of VIN (e.g., such as a threshold value formed by multiplying VIN by a constant X3, where the constant X3 is any suitable non-zero number), the mode transition control circuit 126 provides control signals to cause the power converter 104 to transition to the reduced frequency buck state 204. In at least some examples, X3 is 0.9.

At the reduced frequency buck state 204, the mode transition control circuit 126 provides control signals to cause the power converter 104 to operate in the buck mode of operation at a reduced frequency. The reduced frequency is, in some examples, less than the programmed frequency. Further, in at least some examples, the programmed frequency is greater in value than frequencies of a frequency range of interest, as described above, and the reduced frequency is lesser in value than the frequencies of the frequency range of interest. While controlling the power converter 104 to operate in the buck mode of operation at the reduced frequency, the mode transition control circuit 126 monitors the received input signals to determine whether to transition to the buck-boost state 206 or to return to the buck state 202. For example, while operating in the reduced frequency buck state 204 and the mode transition control circuit 126 determines based on the received input signals that Toff is less than a threshold value of min Toff (e.g., such as a threshold value formed by multiplying min Toff by a constant X4, where the constant X4 is any suitable non-zero number), the mode transition control circuit 126 provides control signals to cause the power converter 104 to transition to a buck-boost state 206. In at least some examples, X4 is 1.02. As another example, while operating in the reduced frequency buck state 204 and the mode transition control circuit 126 determines based on the received input signals that VOUT is greater than a threshold value of VIN (e.g., such as a threshold value formed by multiplying VIN by a constant X5, where the constant X5 is any suitable non-zero number), the mode transition control circuit 126 provides control signals to cause the power converter 104 to transition to the buck-boost state 206. In at least some examples, X5 is 1.02.

Conversely, while operating in the reduced frequency buck state 204 and the mode transition control circuit 126 determines based on the received input signals that Ton has increased to be greater than the threshold amount of min Ton (e.g., such as a threshold value formed by multiplying min Ton by a constant X6, where the constant X6 is any suitable non-zero number), such as resulting from VIN decreasing in value, the mode transition control circuit 126 provides control signals to cause the power converter 104 to transition back to the buck state 202. In at least some examples, X6 is 1.1. In some examples, the determination is made by measuring a pulse width of Ton, such as by determining that the pulse width of Ton has increased to be greater than min Ton multiplied by X6. In other examples, the determination is made by measuring a value of VIN, or a value of Toff.

Also, while operating in the reduced frequency buck state 204 and the mode transition control circuit 126 determines based on the received input signals that Toff has increased to be greater than a threshold amount of min Toff (e.g., such as a threshold value formed by multiplying min Toff by a constant X7, where the constant X7 is any suitable non-zero number), such as resulting from VIN increasing in value, the mode transition control circuit 126 provides control signals to cause the power converter 104 to transition back to the buck state 202. In at least some examples, X7 is 1.1. In some examples, the determination is made by measuring a pulse width of Toff, such as by determining that the pulse width of Toff has increased to be greater than min Toff multiplied by X7. In other examples, the determination is made by measuring a value of VIN, or a value of Ton. As another example, while operating in the reduced frequency buck state 204 and the mode transition control circuit 126 determines based on the received input signals that VOUT is less than a threshold value of VIN (e.g., such as a threshold value formed by multiplying VIN by a constant X8, where the constant X8 is any suitable non-zero number), the mode transition control circuit 126 provides control signals to cause the power converter 104 to transition back to the buck state 202. In at least some examples, X8 is 0.9.

At the buck-boost state 206, the mode transition control circuit 126 provides control signals for controlling the power converter 104 to operate in the buck-boost mode of operation. While controlling the power converter 104 to operate in the buck-boost mode of operation, the mode transition control circuit 126 may control the power converter 104 to operate in one of multiple control methods. For example, while controlling the power converter 104 to operate in the buck-boost mode of operation, the mode transition control circuit 126 may control the power converter 104 to operate according to a four-switch control method, according to a pass-through control method, according to a linear regulation control method, or an alternating buck and boost cycle control method.

In some examples, the mode transition control circuit 126 may control the power converter 104 to operate according to the four-switch control method. In the four-switch control method, all four power transistors of the power converter 104 may be controlled to each switch within a same switching cycle. For example, a first two of the power transistors may switch during a first portion of the switching cycle and a second two of the power transistors may switch during a second portion of the switching cycle, providing buck-boost functionality simultaneously within a switching cycle rather than performing one or more switching cycles of buck operation followed by one or more switching cycles of boost operation. In other examples, the mode transition control circuit 126 may control the power converter 104 to operate according to the pass-through control method. In the pass-through control method, the mode transition control circuit 126 provides control signals to cause the power converter 104 to create a path from the node 150 to the node 152 without performing switching to decrease (e.g., buck) or increase (e.g., boost) a value of VIN. While the power converter 104 is operating according to the pass-through control method, VOUT may have a value approximately equal to VIN minus losses associated with impendences in an output path of the power converter 104 between the node 150 and the node 152. In other examples, the mode transition control circuit 126 may control the power converter 104 to operate according to the linear regulation control method. While the power converter 104 is operating according to the linear regulation control method, the power converter 104 is controlled such that a drain to source resistance (Rds) of one or more of the power transistors of the power converter 104 are controlled to have a particular value. By controlling Rds of one or more of the power transistors to have a certain value, the power converter 104 may operate as a step-down linear regulator. While the power converter 104 is operating according to the alternating buck and boost cycle control method, the mode transition control circuit 126 provides control signals to cause the power converter 104 to alternatingly operate in the buck mode of operation and the boost mode of operation. For example, the control signals provided by the mode transition control circuit 126 cause the power converter 104 to execute a buck cycle of operation, followed by a boost cycle of operation, followed by another buck cycle of operation and continuing in this alternating manner for as long as the mode transition control circuit 126 operates at buck-boost state 206.

While controlling the power converter 104 to operate in the buck-boost mode of operation, the mode transition control circuit 126 monitors the received input signals to determine whether to transition to the reduced frequency buck state 204 or a reduced frequency boost state 208. For example, while operating in the buck-boost state 206 and the mode transition control circuit 126 determines based on the received input signals that Toff is greater than min Toff, the mode transition control circuit 126 provides control signals to cause the power converter 104 to transition back to the reduced frequency buck state 204. While operating in the buck-boost state 206 and the mode transition control circuit 126 determines based on the received input signals that VOUT is less than a threshold value of VIN (e.g., such as a threshold value formed by multiplying VIN by a constant X9, where the constant X9 is any suitable non-zero number), the mode transition control circuit 126 provides control signals to cause the power converter 104 to transition back to the reduced frequency buck state 204. In at least some examples, X9 is 0.98. Similarly, while operating in the buck-boost state 206 and the mode transition control circuit 126 determines based on the received input signals that Ton is greater than min Ton, the mode transition control circuit 126 provides control signals to cause the power converter 104 to transition to the reduced frequency boost state 208. While operating in the buck-boost state 206 and the mode transition control circuit 126 determines based on the received input signals that VOUT is greater than a threshold value of VIN (e.g., such as a threshold value formed by multiplying VIN by a constant X10, where the constant X10 is any suitable non-zero number), the mode transition control circuit 126 provides control signals to cause the power converter 104 to transition back to the reduced frequency boost state 208. In at least some examples, X10 is 1.02.

At the reduced frequency boost state 208, the mode transition control circuit 126 provides control signals to cause the power converter 104 to operate in the boost mode of operation at the reduced frequency. While controlling the power converter 104 to operate in the boost mode of operation at the reduced frequency, the mode transition control circuit 126 monitors the received input signals to determine whether to transition back to the buck-boost state 206 or to transition to the boost state 210. For example, while operating in the reduced frequency boost state 208 and the mode transition control circuit 126 determines based on the received input signals that Ton is less than a threshold value of min Ton (e.g., such as a threshold value formed by multiplying min Ton by a constant X11, where the constant X11 is any suitable non-zero number), the mode transition control circuit 126 provides control signals to cause the power converter 104 to transition to the buck-boost state 206. In at least some examples, X11 is 1.02. As another example, while operating in the reduced frequency buck state 204 and the mode transition control circuit 126 determines based on the received input signals that VOUT is less than a threshold value of VIN (e.g., such as a threshold value formed by multiplying VIN by a constant X12, where the constant X12 is any suitable non-zero number), the mode transition control circuit 126 provides control signals to cause the power converter 104 to transition to the buck-boost state 206. In at least some examples, X12 is 1.02.

Conversely, while operating in the reduced frequency boost state 208 and the mode transition control circuit 126 determines based on the received input signals that Ton has increased to be greater than the threshold amount of min Ton (e.g., such as a threshold value formed by multiplying min Ton by a constant X13, where the constant X13 is any suitable non-zero number), such as resulting from VIN decreasing in value, the mode transition control circuit 126 provides control signals to cause the power converter 104 to transition to a boost state 210. In at least some examples, X13 is 1.02. In some examples, the determination is made by measuring a pulse width of Ton, such as by determining that the pulse width of Ton has increased to be greater than min Ton multiplied by X13. In other examples, the determination is made by measuring a value of VIN, or a value of Toff.

Also, while operating in the reduced frequency boost state 208 and the mode transition control circuit 126 determines based on the received input signals that Toff has increased to be greater than a threshold amount of min Toff (e.g., such as a threshold value formed by multiplying min Toff by a constant X14, where the constant X14 is any suitable non-zero number), such as resulting from VIN increasing in value, the mode transition control circuit 126 provides control signals to cause the power converter 104 to transition to the boost state 210. In at least some examples, X14 is 1.1. In some examples, the determination is made by measuring a pulse width of Toff, such as by determining that the pulse width of Toff has increased to be greater than min Toff multiplied by X14. In other examples, the determination is made by measuring a value of VIN, or a value of Ton. As another example, while operating in the reduced frequency boost state 208 and the mode transition control circuit 126 determines based on the received input signals that VOUT is greater than a threshold value of VIN (e.g., such as a threshold value formed by multiplying VIN by a constant X15, where the constant X15 is any suitable non-zero number), the mode transition control circuit 126 provides control signals to cause the power converter 104 to transition to the boost state 210. In at least some examples, X15 is 1.1.

At boost state 210, the mode transition control circuit 126 provides control signals for controlling the power converter 104 to operate in the boost mode of operation. While controlling the power converter 104 to operate in the boost mode of operation, the mode transition control circuit 126 monitors the received input signals to determine whether to transition to the reduced frequency boost state 208. For example, while operating in the boost state 210 and the mode transition control circuit 126 determines, based on the received input signals that Ton is less than a threshold value of min Ton (e.g., such as a threshold value formed by multiplying min Ton by a constant X16, where the constant X16 is any suitable non-zero number), the mode transition control circuit 126 provides control signals to cause the power converter 104 to transition to a reduced frequency boost state 208. In at least some examples, X16 is 1.1. As another example, while operating in the boost state 210 and the mode transition control circuit 126 determines based on the received input signals that Toff is less than a threshold value of min Toff (e.g., such as a threshold value formed by multiplying min Toff by a constant X17, where the constant X17 is any suitable non-zero number), the mode transition control circuit 126 provides control signals to cause the power converter 104 to transition to the reduced frequency boost state 208. In at least some examples, X17 is 1.1. As yet another example, while operating in the boost state 210 and the mode transition control circuit 126 determines based on the received input signals that VOUT is less than a threshold value of VIN (e.g., such as a threshold value formed by multiplying VIN by a constant X18, where the constant X18 is any suitable non-zero number), the mode transition control circuit 126 provides control signals to cause the power converter 104 to transition to the reduced frequency boost state 208. In at least some examples, X18 is 0.9.

Although not further described herein, in at least some examples the transitions among buck state 202, reduced frequency buck state 204, buck-boost state 206, reduced frequency boost state 208, and/or boost state 210 may be implemented with hysteresis. The hysteresis may prevent bouncing (e.g., rapid and/or repeated) changes between two states in a short time period if signals on which a state transition is determined are near in value to threshold values for making state transition determinations.

Figure 3:
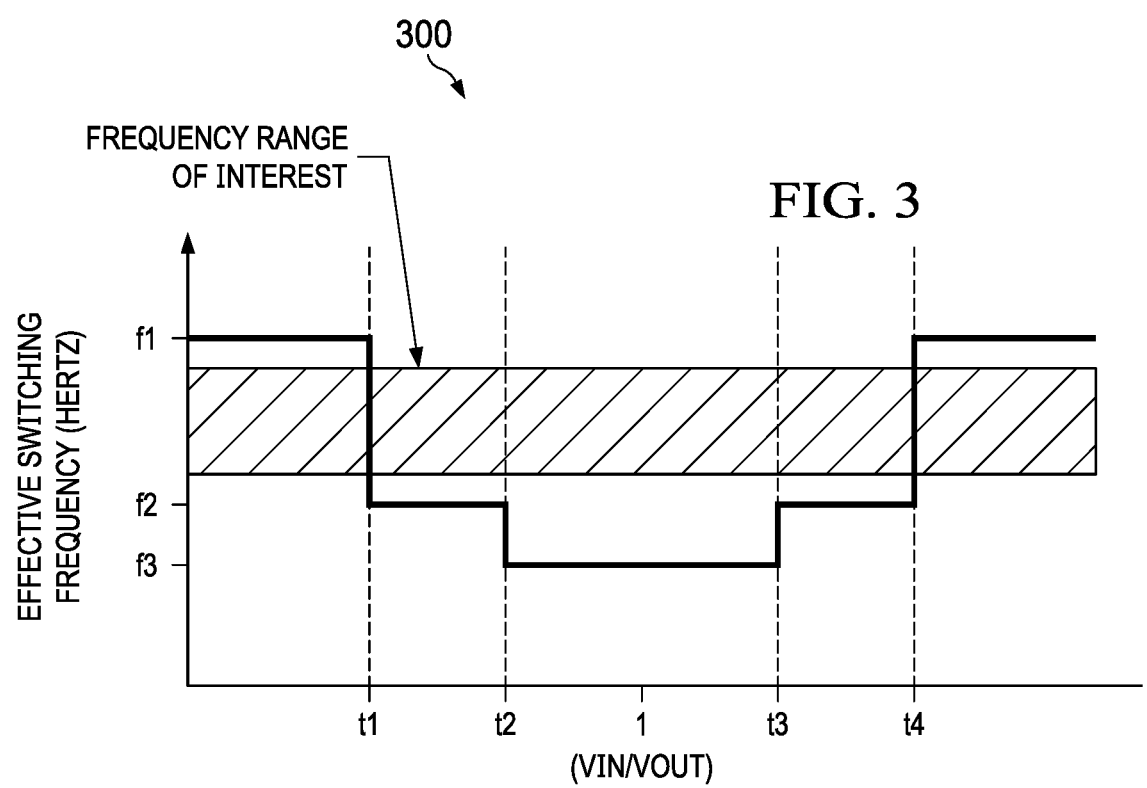
FIG. 3 is an example signal diagram for implementation by a state machine.

FIG. 3 is an example signal diagram 300. In at least some examples, the signal diagram 300 is representative of signal and/or operation of the power converter 104, described above with respect to FIG. 1. The signal diagram 300, in some examples, shows effective switching frequency along a vertical axis and a VIN to VOUT ratio along a horizontal axis. It is assumed that VIN decreases in value as the horizontal axis of the signal diagram 300 progresses from left to right, with VIN approximately equaling VOUT at a midpoint of the horizontal axis of the signal diagram 300. As shown in the signal diagram 300, the power converter 104 is controlled to begin operation at a programmed switching frequency f1. As VIN approaches VOUT, Ton and Toff decrease, as described above. At time t1, Ton becomes less than a threshold value of min Ton, or Toff becomes less than a threshold value of min Toff, and the mode transition control circuit 126 controls the power converter 104 to transition from the switching frequency of f1 to a reduced frequency of f2 at which the power converter 104 continues operation. In at least some examples, f1 is greater in value than frequencies in a frequency range of interest, as shown in the signal diagram 300, and f2 is lesser in value than frequencies in the frequency range of interest.

At time t2, Ton again becomes less than min Ton, or Toff becomes less than min Toff, and the mode transition control circuit 126 controls the power converter 104 to transition from a buck or boost mode of operation into a buck-boost mode of operation in which the power converter 104 continues operation. In at least some examples, while operating in the buck-boost mode of operation between t2 and t3, the effective switching frequency of the power converter 104 reduces by approximately 50% to a frequency f3. At time t3, Ton becomes greater than the threshold value of min Ton, or Toff becomes greater in value than the threshold value of min Toff, and the mode transition control circuit 126 controls the power converter 104 to transition from the buck-boost mode of operation into the buck or boost mode of operation in which the power converter 104 continues operation at f2. At time t4, Ton again becomes greater than the threshold value of min Ton, or Toff becomes greater in value than the threshold value of min Toff, and the mode transition control circuit 126 controls the power converter 104 to transition from the switching frequency of f2 to f3 at which the power converter 104 continues operation.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. As another example, a resistor or capacitor shown and described herein as a single component may instead be multiple resistors or capacitors, respectively, coupled in series between the same two nodes as the single resistor or capacitor. Also, uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described examples, and other examples are possible, within the scope of the claims.

What is claimed is:

1. A circuit, comprising:
   a timing circuit having a timing input and a timing output, the timing circuit configured to:
     receive a timing signal via the timing input; and
     generate a control signal at the timing output by comparing an on-time or an off-time of a power conversion operation with a threshold;
   a mode control circuit having a mode control input and mode control outputs, the mode control input coupled to the timing output, and the mode control circuit configured to:
     in a first mode of power conversion operation, provide buck mode signals or boost mode signals at the mode control outputs at a first frequency;
     in a second mode of the power conversion operation, provide the buck mode signals or the boost mode signals at the mode control outputs at a second frequency lower than the first frequency;
     in a third mode of the power conversion operation, provide buck-boost signals at the mode control outputs at a third frequency lower than the first frequency;
     transition between the first and second modes responsive to the control signal satisfying a first condition; and
     transition between the second and third modes responsive to the control signal satisfying a second condition.

2. The circuit of claim 1, wherein the second frequency is between the first and third frequencies.

3. The circuit of claim 1, wherein the mode control circuit is configured to transition between the first and second modes responsive to a relationship between the on-time and the threshold satisfying the first condition.

4. The circuit of claim 1, wherein the mode control circuit is configured to transition between the first and second modes responsive to a relationship between the off-time and the threshold satisfying the first condition.

5. The circuit of claim 1, wherein:
   the threshold is a first threshold;
   the timing circuit is configured to:
     generate the control signal by comparing the on-time with the first threshold responsive to the mode control circuit being in the first mode; and generate the control signal by comparing the on-time with a second threshold responsive to the mode control circuit being in the second mode; and the mode control circuit is configured to:
transition from the first mode to the second mode responsive to the on-time being below the first threshold; and
transition from the second mode to the first mode responsive to the on-time being above the second threshold.

6. The circuit of claim 1, wherein:
the threshold is a first threshold;
the timing circuit is configured to:
generate the control signal by comparing the off-time with the first threshold responsive to the mode control circuit being in the first mode; and
generate the control signal by comparing the off-time with a second threshold responsive to the mode control circuit being in the second mode; and
the mode control circuit is configured to:
transition from the first mode to the second mode responsive to the off-time being below the first threshold; and
transition from the second mode to the first mode responsive to the off-time being above the second threshold.

7. The circuit of claim 1, wherein:
the threshold is a first threshold;
the timing circuit is configured to:
generate the control signal by comparing the off-time with the first threshold responsive to the mode control circuit being in the second mode; and
generate the control signal by comparing the off-time with a second threshold responsive to the mode control circuit being in the third mode; and
the mode control circuit is configured to:
transition from the second mode to the third mode responsive to the on-time being below the first threshold; and
transition from the third mode to the second mode responsive to the on-time being above the second threshold.

8. The circuit of claim 1, wherein:
the threshold is a first threshold;
the timing circuit is configured to:
generate the control signal by comparing the off-time with the first threshold responsive to the mode control circuit being in the second mode; and
generate the control signal by comparing the off-time with a second threshold responsive to the mode control circuit being in the third mode; and
the mode control circuit is configured to:
transition from the second mode to the third mode responsive to the on-time being below the first threshold; and
transition from the third mode to the second mode responsive to the on-time being above the second threshold.

9. The circuit of claim 1, wherein the threshold is a first threshold, the control signal is a first control signal, and the circuit further comprises a voltage measurement circuit having a voltage measurement output and first and second inputs, the first input coupled to a power converter input, the second input coupled to a power converter output, and the voltage measurement circuit is configured to:
receive, via the first input, a first voltage;
receive, via the second input, a second voltage; and
generate a second control signal at the voltage measurement output by comparing a ratio between the second and first voltages with a second threshold;
wherein the mode control input is a first mode control input, the mode control circuit has a second mode control input coupled to the voltage measurement output and is configured to:
transition between the first and second modes responsive to at least one of the first control signal satisfying the first condition or the second control signal satisfying a third condition; and
transition between the second and third modes responsive to at least one of the first control signal satisfying the second condition or the second control signal satisfying a fourth condition.

10. A circuit, comprising:
a voltage measurement circuit having a voltage measurement output and first and second inputs, the first input coupled to a power converter input, the second input coupled to a power converter output, and the voltage measurement circuit configured to:
receive, via the first input, a first voltage;
receive, via the second input, a second voltage; and
generate a control signal at the voltage measurement output by comparing a ratio between the second and first voltages with a threshold; and
a mode control circuit having a mode control input and mode control outputs, the mode control input coupled to the voltage measurement output, and the mode control circuit configured to:
in a first mode of power conversion operation, provide buck mode signals or boost mode signals at the mode control outputs at a first frequency;
in a second mode of the power conversion operation, provide the buck mode signals or the boost mode signals at the mode control outputs at a second frequency lower than the first frequency;
in a third mode of the power conversion operation, provide buck-boost signals at the mode control outputs at a third frequency lower than the first frequency;
transition between the first and second modes responsive to the control signal satisfying a first condition; and
transition between the second and third modes responsive to the control signal satisfying a second condition.

11. The circuit of claim 10, wherein the second frequency is between the first and third frequencies.

12. The circuit of claim 10, wherein:
the threshold is a first threshold;
the voltage measurement circuit is configured to:
generate the control signal by comparing the ratio with the first threshold responsive to the mode control circuit being in the first mode; and
generate the control signal by comparing the ratio with a second threshold responsive to the mode control circuit being in the second mode; and
the mode control circuit is configured to:
provide the buck mode signals in the first and second modes of the power conversion operation;
transition from the first mode to the second mode responsive to the control signal indicating that the ratio is above the first threshold; and
transition from the second mode to the first mode responsive to control signal indicating that the ratio is below the second threshold.

13. The circuit of claim 10, wherein:
the threshold is a first threshold;
the voltage measurement circuit is configured to:
    generate the control signal by comparing the ratio with the first threshold responsive to the mode control circuit being in the first mode; and
    generate the control signal by comparing the ratio with a second threshold responsive to the mode control circuit being in the second mode; and
the mode control circuit is configured to:
    provide the boost mode signals in the first and second modes of the power conversion operation;
    transition from the first mode to the second mode responsive to the control signal indicating that the ratio is below the first threshold; and
    transition from the second mode to the first mode responsive to the control signal indicating that the ratio is above the second threshold.

14. The circuit of claim 10, wherein:
the threshold is a first threshold;
the voltage measurement circuit is configured to:
    generate the control signal by comparing the ratio with the first threshold responsive to the mode control circuit being in the second mode; and
    generate the control signal by comparing the ratio with a second threshold responsive to the mode control circuit being in the third mode; and
the mode control circuit is configured to:
    provide the buck mode signals in the first and second modes of the power conversion operation;
    transition from the second mode to the third mode responsive to the control signal indicating that the ratio is above the first threshold; and
    transition from the third mode to the second mode responsive to the control signal indicating that the ratio is below the second threshold.

15. The circuit of claim 10, wherein:
the threshold is a first threshold;
the voltage measurement circuit is configured to:
    generate the control signal by comparing the ratio with the first threshold responsive to the mode control circuit being in the second mode; and
    generate the control signal by comparing the ratio with a second threshold responsive to the mode control circuit being in the third mode; and
the mode control circuit is configured to:
    provide the boost mode signals in the first and second modes of the power conversion operation;
    transition from the second mode to the third mode responsive to the control signal indicating that the ratio is below the first threshold; and
    transition from the third mode to the second mode responsive to the control signal indicating that the ratio is above the second threshold.

16. The circuit of claim 10, wherein the threshold is a first threshold, the control signal is a first control signal, and the circuit further comprises a timing circuit having a timing input and a timing output, and the timing circuit is configured to:
receive a timing signal via the timing input;
generate a second control signal at the timing output by comparing an on-time or an off-time of the power conversion operation with a second threshold; and
wherein the mode control input is a first mode control input, the mode control circuit has a second mode control input coupled to the timing output and is configured to:
    transition between the first and second modes responsive to at least one of the first control signal satisfying the first condition or the second control signal satisfying a third condition; and
    transition between the second and third modes responsive to at least one of the first control signal satisfying the second condition or the second control signal satisfying a fourth condition.

17. A system, comprising:
a power converter having a voltage input, a voltage output, and control inputs;
a timing circuit having a timing input and a timing output, the timing circuit configured to:
    receive a timing signal via the timing input; and
    generate a control signal at the timing output by comparing an on-time or an off-time of a power conversion operation with a threshold;
a mode control circuit having a mode control input and mode control outputs, the mode control input coupled to the timing output, the mode control outputs coupled to the control inputs, and the mode control circuit configured to:
    in a first mode, provide buck mode signals or boost mode signals at the mode control outputs at a first frequency;
    in a second mode, provide the buck mode signals or the boost mode signals at the mode control outputs at a second frequency lower than the first frequency;
    in a third mode, provide buck-boost signals at the mode control outputs at a third frequency lower than the first frequency; and
    transition between the first and second modes responsive to the control signal satisfying a first condition; and
    transition between the second and third modes responsive to the control signal satisfying a second condition.

18. The system of claim 17, wherein the second frequency is between the first and second frequencies.

19. The system of claim 17, wherein the mode control circuit is configured to transition between the first and second modes responsive to the control signal indicating whether the on-time exceeds the threshold.

20. The system of claim 17, wherein the mode control circuit is configured to transition between the first and second modes responsive to the control signal indicating whether the off-time exceeds the threshold.

21. The system of claim 17, wherein the threshold is a first threshold, the control signal is a first control signal, and the system further comprises a voltage measurement circuit having a voltage measurement output and first and second inputs, the first input coupled to the voltage input, the second input coupled to the voltage output, and the voltage measurement circuit is configured to:
receive, via the first input, a first voltage;
receive, via the second input, a second voltage; and
generate a second control signal at the voltage measurement output by comparing a ratio between the second and first voltages with a second threshold; and
wherein the mode control input is a first mode control input, the mode control circuit has a second mode control input coupled to the voltage measurement output and is configured to:
    transition between the first and second modes responsive to at least one of the first control signal satisfying the first condition or the second control signal satisfying a third condition; and transition between the second and third modes responsive to at least one of the first control signal satisfying the second condition or the second control signal satisfying a fourth condition.

\* \* \* \* \*